US008086614B2

(12) United States Patent
Novy

(10) Patent No.: US 8,086,614 B2
(45) Date of Patent: Dec. 27, 2011

(54) METHOD AND APPARATUS FOR GENERATING RELEVANCE-SENSITIVE COLLATION KEYS

(75) Inventor: Alon R. J. Novy, Rushcutters Bay (AU)

(73) Assignee: Think Software Pty Ltd, Sydney (AU)

( * ) Notice: Subject to any disclaimer, the term of this patent is extended or adjusted under 35 U.S.C. 154(b) by 269 days.

(21) Appl. No.: 12/412,259

(22) Filed: Mar. 26, 2009

(65) Prior Publication Data
US 2009/0259660 A1 Oct. 15, 2009

Related U.S. Application Data

(63) Continuation of application No. 11/377,941, filed on Mar. 17, 2006, now abandoned.

(60) Provisional application No. 60/663,983, filed on Mar. 21, 2005.

(51) Int. Cl.
G06F 17/30 (2006.01)
G06F 7/00 (2006.01)

(52) U.S. Cl. ......... 707/752; 707/723; 707/748; 707/955

(58) Field of Classification Search .................. None
See application file for complete search history.

(56) References Cited

U.S. PATENT DOCUMENTS

| 3,593,309 | A | | 7/1971 | Clark et al. ............... 340/172.5 |
| 3,602,895 | A | | 8/1971 | Loizides .................. 340/172.5 |
| 4,209,845 | A | | 6/1980 | Berger et al. ................. 364/900 |
| 4,417,321 | A | | 11/1983 | Chang et al. .................. 364/900 |
| 4,459,678 | A | * | 7/1984 | McCaskill et al. ............ 715/700 |
| 4,499,555 | A | | 2/1985 | Huang ........................ 364/900 |
| 4,559,612 | A | | 12/1985 | Vrielink ...................... 364/900 |
| 4,567,572 | A | | 1/1986 | Morris et al. ................ 364/900 |
| 4,595,995 | A | | 6/1986 | Alles .......................... 364/900 |
| 4,628,483 | A | | 12/1986 | Nelson ........................ 364/900 |
| 5,675,818 | A | * | 10/1997 | Kennedy ......................... 704/8 |
| 5,873,111 | A | * | 2/1999 | Edberg ........................ 715/202 |
| 6,014,664 | A | | 1/2000 | Fagin ............................ 707/5 |
| 6,341,240 | B1 | | 1/2002 | Bermon et al. ................. 700/97 |

(Continued)

FOREIGN PATENT DOCUMENTS

SU 1410021 7/1988

OTHER PUBLICATIONS

"Commander Wireless Router With iwacs™ Technology" Datasheet, Prismiq, Inc., Santa Barbara, CA, Downloaded Jul. 15, 2005. Available online at <http://www.prismiq.com/products/pdf/Commander%20Data%20Sheet%20v1.pdf>.

(Continued)

*Primary Examiner* — Greta Robinson
*Assistant Examiner* — James J Wilcox
(74) *Attorney, Agent, or Firm* — Paul Davis; Goodwin Procter LLP

(57) ABSTRACT

A method and apparatus for generating collation keys that can be used by sorting methods so as to arrange a sequence of data objects in order of their semantic relevance to the user or their relevance to an operating context. The constituent data values of each data object are "weighted" according to semantic relevance and a composite collation key is generated that reflects the data object's overall relevance.

20 Claims, 5 Drawing Sheets

U.S. PATENT DOCUMENTS

| | | | |
|---|---|---|---|
| 6,381,616 B1* | 4/2002 | Larson et al. | 1/1 |
| 6,738,769 B2 | 5/2004 | Sharp | 707/7 |
| 6,877,003 B2* | 4/2005 | Ho et al. | 1/1 |
| 6,928,438 B2* | 8/2005 | Daray et al. | 1/1 |
| 7,103,596 B2* | 9/2006 | Abe et al. | 1/1 |
| 7,899,665 B2* | 3/2011 | Davis et al. | 704/8 |
| 2002/0091691 A1* | 7/2002 | Sharp | 707/7 |
| 2003/0217071 A1* | 11/2003 | Kobayashi et al. | 707/102 |
| 2004/0003132 A1* | 1/2004 | Stanley et al. | 709/316 |
| 2005/0251519 A1* | 11/2005 | Davis | 707/100 |
| 2006/0041422 A1* | 2/2006 | Davis et al. | 704/9 |
| 2006/0161574 A1* | 7/2006 | Ricard et al. | 707/102 |

OTHER PUBLICATIONS

C. Costantini, D. Fum, G. Guida, A. Montanari and C. Tasso, "Text Understanding With Multiple Knowledge Sources: An Experiment in Distributed Parsing," In Proc. of the 3rd Conf. of the European Chapter of the Association for Computational Linguistics, pp. 75-79, Copenhagen, Denmark, Apr. 1-3, 1987.

R. Weischedel, D. Ayuso, S. Boisen, H. Fox and R. Ingria, "A New Approach to Text Understanding," In Proc. of Speech and Natural Language Workshop. N.Y. 1992.

A. Max, "Interpreting Communicative Goals in Constrained Domains Using Generation and Interactive Negotiation," Proceedings of the Second Workshop on Text Meaning and Interpretation: ACL 2004.

M. Dymetman, A. Max, and K. Yamada, "Towards Interactive Text Understanding," In Proceeding of ACL-03, interactive posters session, Sapporo, Japan, 2003.

* cited by examiner

METHOD AND APPARATUS FOR GENERATING RELEVANCE-SENSITIVE COLLATION KEYS

RELATED PATENT APPLICATIONS

The present invention is a continuation of U.S. application Ser. No. 11/377,941 Filed Mar. 17, 2006, now abandoned. U.S. application Ser. No. 11/377,941 claims priority of U.S. Provisional Patent Application No. 60/663,983 filed 21 Mar. 2005 to inventor Novy, and titled METHOD AND APPARATUS FOR GENERATING RELEVANCE-SENSITIVE COLLATION KEYS. The contents of such U.S. patent application Ser. No. 11/377,941 and U.S. Provisional Patent Application No. 60/663,983 are incorporated herein by reference.

BACKGROUND

The present invention relates to computer-based scheduling of complex technical tasks in a control system, and in particular to determine in a control system an ordering for a set of complex tasks that have multiple attributes according to a single ordering criterion that takes into account plurality of the attributes.

There is often a need to schedule complex processes that includes a large set of tasks. For example, in a complex processing plant there may be a need to schedule and manage a large number of technical tasks. The technical tasks have multiple attributes, e.g., attributes that are definable by a numeric quantity. A computerized control system may be involved in assigning these tasks to one or more task performing entities of the plant. Such a computerized control system may include a data structure, e.g., a database in which each task is represented by a record. Each task's attributed can be represented by different fields in the records.

In such a control system, there is often a need to determine the ordering of the tasks, e.g., which task is to be performed next. There also may be a need for the control system to display the ordering of the tasks on a display device so that a human user can view the ordering. To determine such ordering, it is well known to assign a key, e.g., a sort key to each record when designing the database, and for the control system to sort the records according to the sort key. If the tasks in the control system are represented by records having fields, one of the fields is typically designated as the sort field. Other fields also may be assigned as sort fields, e.g., as secondary sort fields.

In many situations it is difficult for the control system to determine which field makes the most useful primary sort field, which is the most useful secondary sort field etc. For example, suppose the control system is to control performing a set of tasks that relate to safety. Suppose on the fields is an indication of the importance of the task as it related to safety, and another of fields is an indication of the time remaining until the task has to be completed else safety is affected. Suppose the control system is to schedule performing of the tasks as to which is to be performed first, which second, etc. Which is the primary sort field? If the sort is performed according to importance, one or more record representing tasks that are due within a short period of time might be placed towards the end of the sorted set simply because the tasks due within the short period happen not to be very important. Hence this fails to produce a sort order that corresponds to the sequence in which the tasks should be scheduled by the control system to be performed. On the other hand, for the control system to sort by when completion is required also may produces undesirable results. A task of critical importance might now be scheduled towards the end of the sorted set because it is not due for time. Also, the completion period is not accounted for.

Thus, there is a need in the art for a method and for a control system that can schedule tasks according to a single criterion e.g., a single sort key determined by a combination of attributes.

The prior art includes U.S. Pat. No. 6,738,769; to Sharp that describes sorting multiple-typed data, U.S. Pat. No. 3,593,309; to Clark et al. that describes a method and means for generating compressed keys; U.S. Pat. No. 3,602,895 to Loizides that describes a one key byte per key indexing method and means therefor; U.S. Pat. No. 4,209,845 to Berger, et al. that describes a file qualifying and sorting system; U.S. Pat. No. 4,417,321 to Chang, et al. that describes qualifying and sorting file record data; U.S. Pat. No. 4,499,555 to Huang that describes a sorting technique; U.S. Pat. No. 4,559,612 to Vrielink that describes a sorting device for data words; U.S. Pat. No. 4,567,572 to Morris et al. that describes a fast parallel sorting processor; U.S. Pat. No. 4,595,995 to Alles that describes a sort circuit and a method using multiple parallel sorts of the sorted items; and U.S. Pat. No. 4,628,483 to Nelson that describes a one level sorting network.

FIG. 1 shows a flowchart of a typical prior art sorting method that can be incorporated in a computerized control system for scheduling tasks, the method operating on a set of data objects, which, in one example, are database records. Typically, in 10, the user first selects the set of data objects, e.g., records to be sorted and in 20 selects the fields containing the values on which the ordering is based. The sorting method in 30 generates the relevant collation keys for each selected field in the selected records and proceeds in 40 to sort these collation keys. Once the collation keys have been sorted, the method in 50 produces the relevant output, e.g., in the case of tables of a database, using the row indices associated with the now-ordered collation keys.

According to such prior art methods, the step 10 of selecting sort fields also determines a priority order among the sort fields. This order is used as a tiebreaker in the event that at least two collation keys are equivalent, a situation that would otherwise result in only a partial ordering. This process is illustrated in FIG. 2, which shows in simplified form a flowchart of collation key comparison in a typical prior art sort method. If (in 80) at least two data objects have the same value in the primary sort field, the method in 90 compares the secondary sort fields. If the secondary sort field values are again equivalent and it is still not possible to order the two data objects, the method in 90 compares the tertiary sort fields, and so on. In some—possible many—cases, only a partial ordering will be possible.

As discussed above, one limitation of such a prior art method is that no attempt is made to account for the degree to which individual data objects are "relevant" to the user and/or the user's operating context, where operating context refers to the circumstances within which the sort operation is executed, including one or more of the state of to-be-sorted data objects in memory (temporary or permanent), which files are currently open, which records are currently being viewed or being input, the identity, preference settings and/or the security profile of the user and of other users or system with which the user is conducting an electronic transaction. By the term "relevance" is included the degree to which a data object has priority in the case of scheduling tasks, or the like.

Clearly it would be better not to force the user to scan through a large amount of what the user might consider information of low relevance, to pick out the subset of items he/she actually wishes to devote attention to at a given point in time.

Thus there is a need in the art for a sorting method that takes into account a measure of relevance to the user and/or the user's operating context. There also is a need in the art to determine such a measure of relevance or context on which to base the sorting.

Another problem in prior art methods is a result of the prior art methods ordering records taking a single measure of relevance into account, the measure a function of a plurality of sort fields. In such, it is necessary to always produce the list of all possible records, since it cannot be guaranteed that items in the latter part of the list are less relevant to the user than those in the earlier part. This increases the risk of what we call "information overload."

Thus, prior art methods can predispose the user to loose sight of important information items among items of lesser relevance, to waste time reading irrelevant material and to waste paper in unnecessarily long print-outs. All this according to a measure of "relevance."

Thus, there is a need in the art for sorting methods that can restrict the sorting to only the most relevant data objects of a set of data objects.

Frequently, within a set of data objects, there emerge natural relationships between individual data objects, such that some data objects are more closely related to each other than are other data objects. Simply sorting data objects according to the value in a particular field or to values in a set of fields does not guarantee that related objects will be reproduced in close proximity in the results list. This causes a user viewing the results to need to jump from one place in the sorted list to another to get a comprehensive view of a set of related data objects. Such viewing can be a complex and error prone process; the user is often unsure whether all related items have been viewed, and where the next related item is located.

Thus there is a need in the art for a sorting method that orders closely related data objects close to each other.

SUMMARY

Described herein is a method for a control system that includes the control system ordering a set of data objects, e.g., objects representing tasks, according to an ordering criterion that incorporated a plurality of attributes of the data objects.

Several aspects and advantages of embodiments of the present invention include at least one of:

Generating collation keys such that a set of data objects can be sorted in order of their respective degree of relevance to the user, or to the user's current operating context.

Providing for client programs to limit the number of data objects presented to the user based on a reliable assessment of their relevance to the user and/or to the user's operating context.

Increasing the efficiency with which human users can read and interpret an ordered list of data objects;

Reducing the risk of overwhelming human users with too much information, or by burying important information among less relevant information.

Providing for flexible and configurable rules to govern the assessment of degree of relevance of individual objects being sorted.

Providing for the sorting of data objects in a manner that positions semantically related data objects adjacently or in close proximity.

Generating collation keys in such a way as to allow conventional sort methods to make use of these collation keys.

Embodiments of the invention can provide one or more of the above aspects and advantages to a control system designed to control scheduling of tasks. Embodiments of the invention can also be used in a computerized task scheduler to help human users sort data objects, e.g., to schedule tasks. Embodiments of the invention also can be used by computer-based systems when each such computer-based system act as "users" of the sorted data objects. Embodiments of the invention can also be used in a computer-based activity management system. By an activity management system is meant a computer based system for managing activities, risks, and/or issues management by providing information that relates to these activities, risks, and/or issues, and for processing this information. Examples of such computer-based activity management systems include computerized project management, project management systems, operational risks and issues management systems, bug/defect tracking systems; resource scheduling systems, management "dashboards" that provide summaries and overviews of current activities, management and executive reporting systems, activity/risk/issue/change request management systems, and knowledge management systems.

Further aspects and advantages will become apparent from a consideration of the ensuing description and drawings.

Described herein are a system and a method for generating collation keys such that a sort operation conducted on these collation keys orders a set of data objects according to their respective degrees of relevance to the user and/or the user's current operating context.

One embodiment of the present invention provides, e.g., generates the collation keys by creating a set of rankings for each of a set of data objects and for each field used for sorting. For each data object being sorted, one ranking is generated per sort field.

For each ranking for each sort field, a weight value is computed indicative of the relevance of the ranking to the user and/or the user's current operating context. A simple mathematical transformation is used to combine the individual weight and ranking pairs to form a composite collation key. The value of the composite collation key for a data object is influenced to a "degree of influence" by each of the rankings assigned to that data object. The degree of influence of each ranking is determined by the weight assigned to that ranking.

According to one aspect of the invention, there is provided a method including: providing, e.g., generating a plurality of ranking values for each of a plurality of data objects. The data objects are for sorting, such that a ranking value is generated for each sort field for each data object. The method further includes providing a function of a plurality of the ranking values corresponding to a plurality of sort fields, and using the provided function to generate to generate a single collation key value for the data objects, the collation key arranged to provide for ordering the plurality of data objects, the function indicative of the relative degree to which the ranking value for each of the plurality of sort fields influences the collation key;

In one version, the providing the function, and using of the provided functions includes generating a weight value for each of the ranking value for plurality of sort fields, each weight value indicative of the degree to which the ranking value for the sort field influences a collation key for sorting the data objects, the generating of the weight order according to a weight generating function Using of the provided functions further includes generating a value of the collation key for each of the data objects using the respective weight values to weight the ranking values of the set of sort keys.

In one embodiment, the collation key is arranged to provide for ordering the plurality of data objects according to their respective relevance to a user, user operating context, or a system acting as a user system.

In one embodiment, the data objects represent tasks and are part of data in a computerized control system scheduling a plurality of tasks. In another embodiment, the data objects are part of data in a computer-based activity management system.

In one version, the plurality of data objects is for sorting according to a set of one or more sort fields.

In one version, the generating of the collation key includes weighting each of the ranking for a sort key with its corresponding weight value, and combining the results of weighting to form the collation key.

According to another aspect of the invention, there is provided a computer-readable storage medium storing computer-readable instructions that when executed by at least one processor of a processing system cause the processor to carry out a method including: generating a plurality of ranking values for each of a plurality of data objects. The data objects are for sorting, such that a ranking value is generated for each sort field for each data object. The method further includes generating a weight value for each of the ranking value for each sort field indicative of the degree to which the ranking value for the sort field influences a collation key for sorting the data objects. The generating of the weight order is according to a weight generating function. The method further includes generating a value of the collation key for each of the data objects, the collation key arranged to provide for ordering the plurality of data objects according to their respective relevance to a user, user operating context, or a system acting as a user system.

According to another aspect of the invention, there is provided an apparatus including a processing system programmed to implement a method a method including: generating a plurality of ranking values for each of a plurality of data objects. The data objects are for sorting, such that a ranking value is generated for each sort field for each data object. The method further includes generating a weight value for each of the ranking value for each sort field indicative of the degree to which the ranking value for the sort field influences a collation key for sorting the data objects. The generating of the weight order is according to a weight generating function. The method further includes generating a value of the collation key for each of the data objects, the collation key arranged to provide for ordering the plurality of data objects according to their respective relevance to a user, user operating context, or a system acting as a user system.

According to another aspect of the invention, there is provided an apparatus including an apparatus. The apparatus includes means for generating a plurality of ranking values for each of a plurality of data objects. The data objects are for sorting, such that a ranking value is generated for each sort field for each data object. The apparatus also includes means for generating a weight value for each of the ranking value for each sort field indicative of the degree to which the ranking value for the sort field influences a collation key for sorting the data objects. The generating of the weight order is according to a weight generating function. The apparatus further includes means for generating a value of the collation key for each of the data objects, the collation key arranged to provide for ordering the plurality of data objects according to their respective relevance to a user, user operating context, or a system acting as a user system.

BRIEF DESCRIPTION OF THE DRAWINGS

Like reference numbers and designations in the various drawings indicate like elements. Other aspects and features will be clear from the description herein.

DETAILED DESCRIPTION

Presented herein are a method and a software product for a control system, e.g., a computer program to schedule a set of tasks, in order to sort a set of data objects. The method takes a measure of relevance into account, the measure of relevance dependent on a plurality of properties of the data objects. For the case of scheduling, by the term "relevance" is included the degree to which a task has priority in the scheduling or the like.

Figure 5:
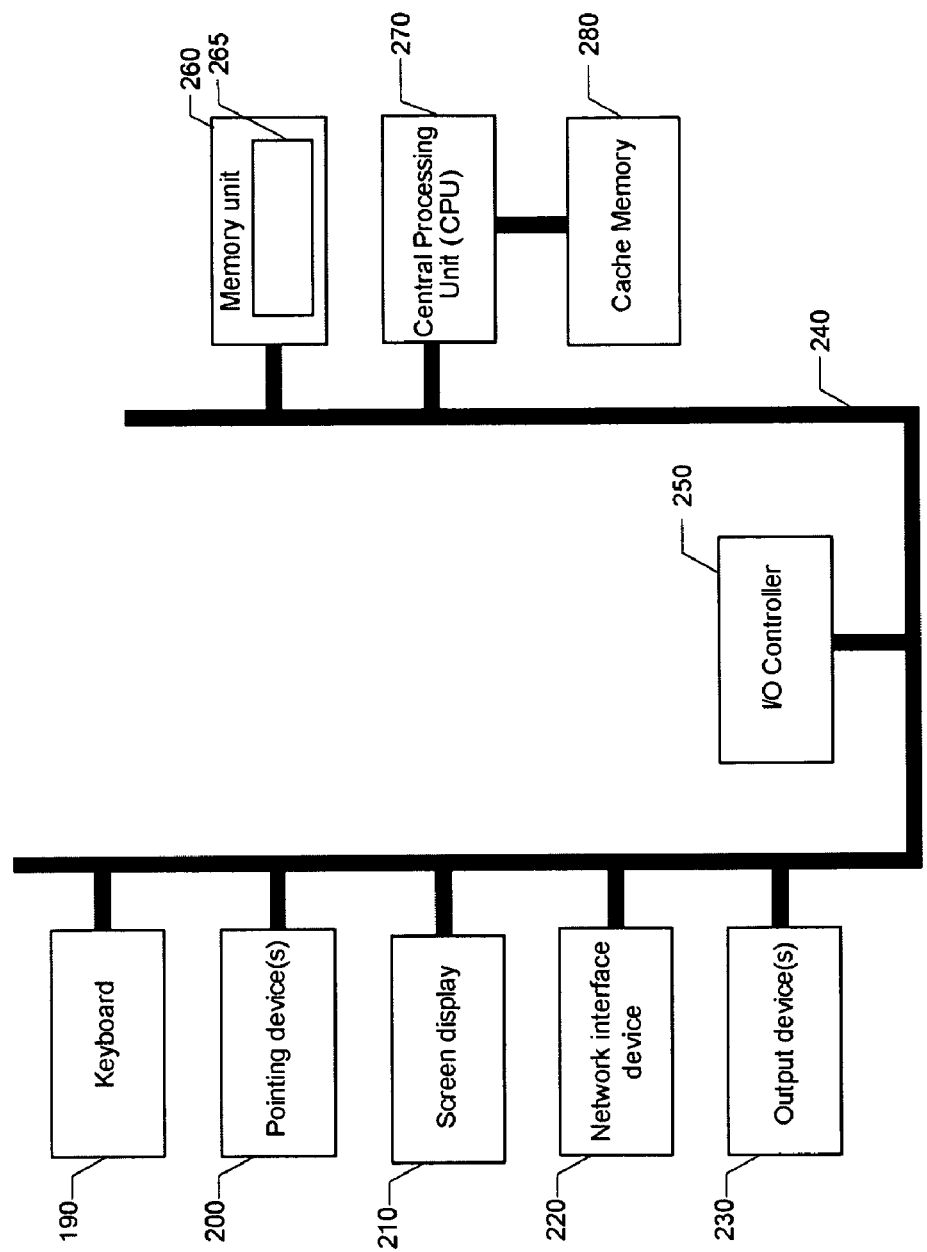
FIG. 5 shows a simplified block diagram of a processing system such that is used to implement an embodiment of the present invention.

Aspects of the invention are typically implemented as a computer-readable medium storing a set of computer-readable instructions to instruct at least one processor of a processing system to implement a method. FIG. 5 shows a simple representation of one processing system that includes a single CPU 270 having a cache memory 280. The elements are coupled by a bus subsystem 240, shown here for simplicity as a single bus. The processing system further includes a memory subsystem 270 including main RAM and/or a static RAM, and/or ROM. If the processing system requires a display, such a display 210 is included, e.g., a liquid crystal display (LCD) or a cathode ray tube (CRT) display. If manual data entry is required, the processing system also includes an input device such as one or more of an alphanumeric input unit such as a keyboard 190, a pointing control device 200 such as a mouse, and so forth. A memory unit 260 is included. The term memory unit as used herein also encompasses a storage system such as a disk drive unit. The processing system in some configurations may include a one or more devices 230, an I/O controller 250, and a network interface device 220. The memory subsystem thus includes a computer-readable medium stores machine readable code segments (e.g., software) including instructions for performing, when executed by the processing system, one of more of the methods described herein. The software may reside in the hard disk, or may also reside, completely or at least partially, within the RAM and/or within the processor during execution thereof by the computer system. Thus, in one version, the memory and the processor also constitute computer-readable medium storing machine-readable instructions. The instructions for implementing an embodiment of the method are shown as 265 in the memory subsystem 260. While a system such as shown in FIG. 5 might in general be prior art, the system shown in FIG. 5 includes the computer-readable medium storing instructions that when executed by the processor implement the method described herein, so is not prior art.

Figure 1:
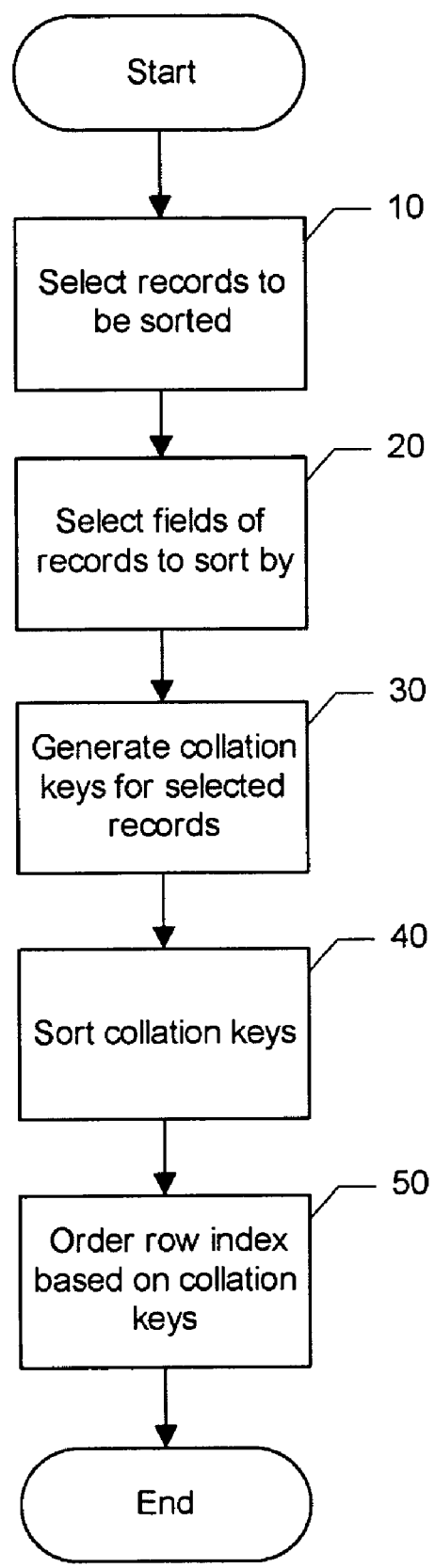
FIG. 1 shows in simplified form a flowchart of a typical prior art sort method.
Figure 3:
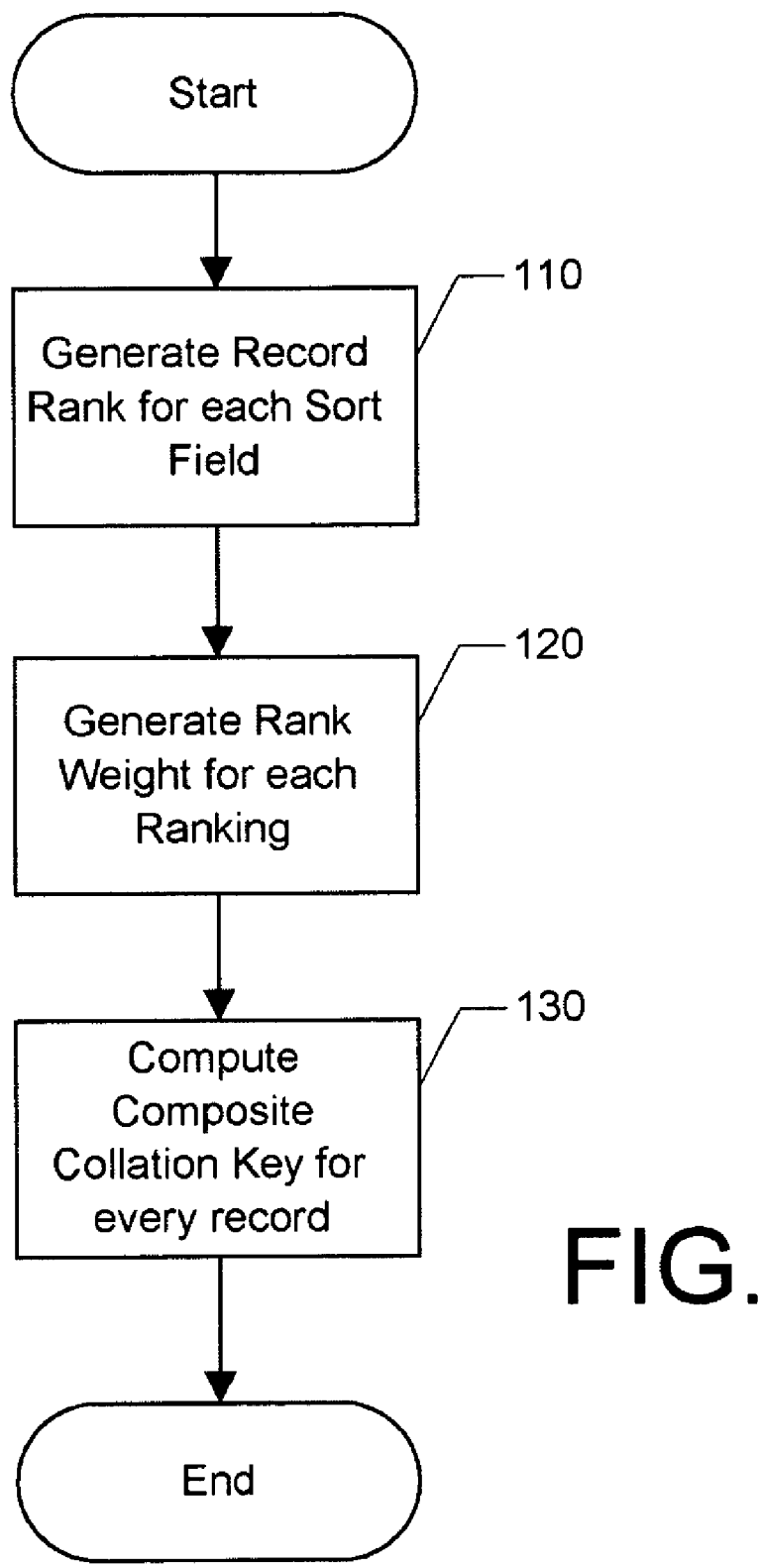
FIG. 3 shows in simplified form a flowchart for generating relevance-sensitive collation keys.

One method embodiment of the present invention is illustrated in FIG. 3, which shows a simplified flowchart. According to this embodiment, a plurality of data objects is to be sorted. The plurality is denoted herein by $\{O1, O2, O3 \ldots On\}$, where $Fi, i=1, \ldots, n$ are the data objects, and n denotes the number of objects Each data object has a plurality of fields, including a plurality of sort fields, the plurality sort fields denoted by $\{F1, F2, F3 \ldots Fm\}$, where $Fi, i=1, \ldots, m$ are the sort fields, and m denotes the number of sort fields. The method includes in 110 generating a ranking for each data object for each sort field. For this, 110 includes performing a conventional sort operation for each of the sort fields. For purposes of this description, the conventional sort method of FIG. 1 is assumed. Each rank is taken to be the position the data object was assigned during the sort operation on the sort field.

The resulting rankings is denoted herein as the set {ROiFj} for i=1, . . . n, and for j=1, . . . , m, where ROiFj denoting the ranking of the j'th field for the i'th object, that is, the positional rank assigned to data object Oi when the plurality of data objects is sorted according to their values in field Fj and so on.

For each ranking for each sort field, the method includes in 120 computing a weight value indicative of the relevance of the ranking for the sort field to the composite collation key used in the final collation sequence of the sorting method. The final collation sequence is then used as the selected field for sorting, e.g., as step 20 in the conventional sort method of FIG. 1. These computed weight values are denoted herein by {WOiFj} for i=1, . . . , n, and for j=1, . . . , m, with WOiFj denoting the weight of the rank ROiFj of the j'th sort field for the i'th object in generating the composite collation key for object Oi.

In one embodiment, each weight value is computed as a real number between 0 and 1, where 0 represents the least possible weight value and 1 represents the maximum weight value.

The method includes in 130 computing a composite collation key for each data object. The composite key for object Oi is denoted herein by Ki i=1, . . . , n. In one embodiment, the Ki is computed according the formula:

$$K_i = \sum_{j=1}^{m} \left( \frac{W_{OiFj}}{R_{OiFj}} \right), i = 1, \ldots, n,$$

where m is the total number of sort fields per data object.

Each ranking is represented by a positive integer. In one embodiment, the division operation in the above formula is carried out on floating point numbers, such that the rank, if an integer is converted to a real number or equivalent floating point data type ahead of the division operation when computing according to the above formula.

Computing Rankings

According to one embodiment of the present invention, one method of generating the ranking is simply to run an appropriate conventional sort operation, e.g., the method of FIG. 1, against the set of data objects to be sorted. A stable sort method is preferable, i.e., a sort method that always resolves a partial order in the same way.

Computing Weights

According to one embodiment, the computation of a field's weight in determining the composite collation key for a given data object would be handled by a function that might vary from field to field. For example, some fields may be linked to a constant-valued weight function that always returns the same weight irrespective of the value a data object contains in that field or any other field, while other fields may be linked to continuous or piecemeal functions that vary the output weight depending on the value of the field. In yet another variation, some weights depend on the values of other fields in the data object.

In cases where a field has not been assigned a weight function, but the field is included as a sort field in a sort operation, a default constant-valued weight function should be used. The inventors have found that a value 0.5 is an appropriate default in that it provides good results in most cases. In some situations, some experimentation may be needed to provide a different default weight value.

Computing Composite Collation Keys

Figure 2:
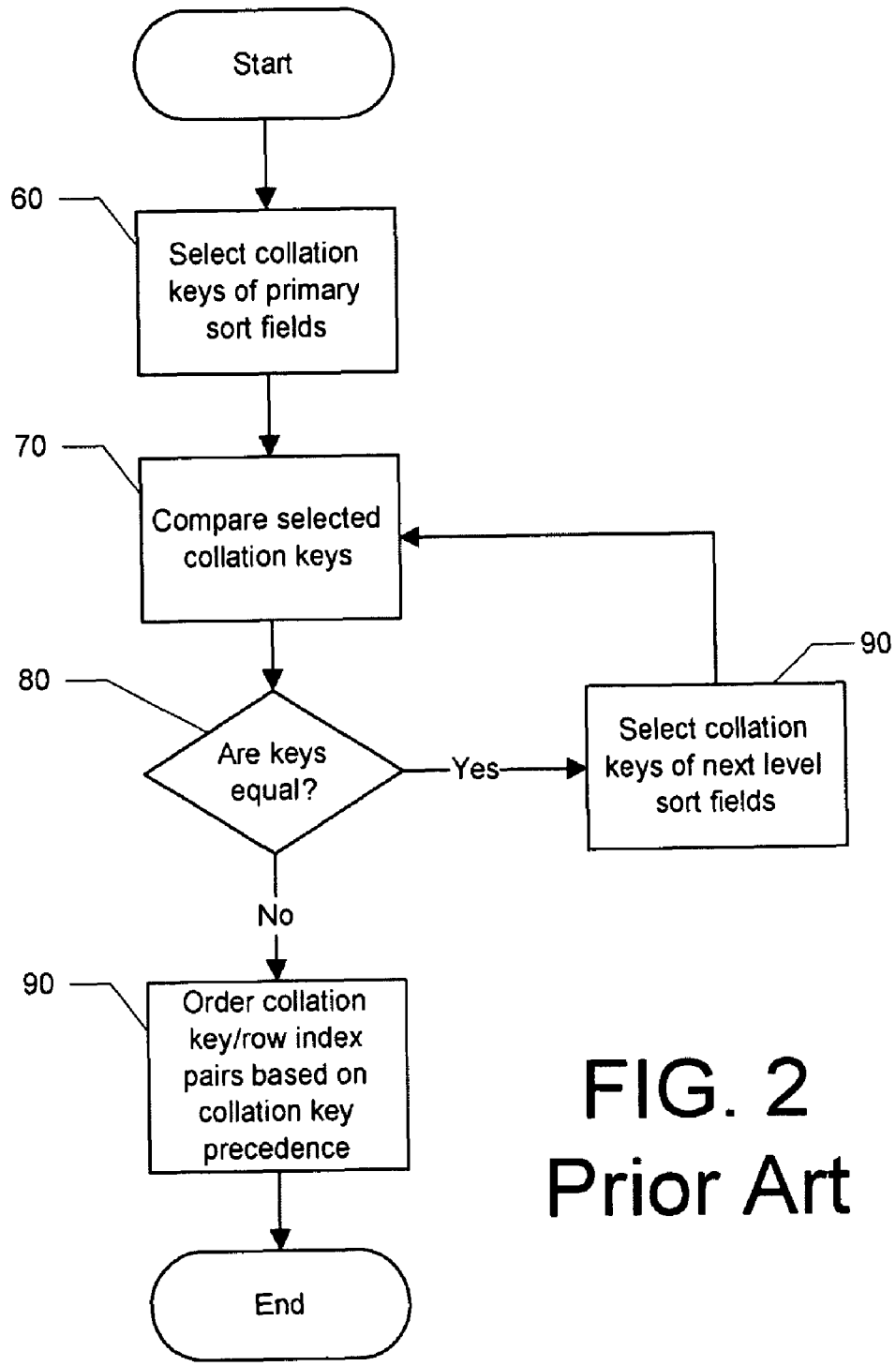
FIG. 2 shows in simplified form a flowchart of collation key comparison in a typical prior art sort method.

Each composite collation key includes a reference to the respective data object or record, e.g., in the form of a pointer, object reference, index value, or equivalent reference to the respective data object. Once the composite collation keys have been ordered, e.g., using a conventional sort method such as shown in FIG. 2, the set of data objects can be ordered based on the pointers, object references or index values of the sorted collation keys.

An Example

Figure 4:
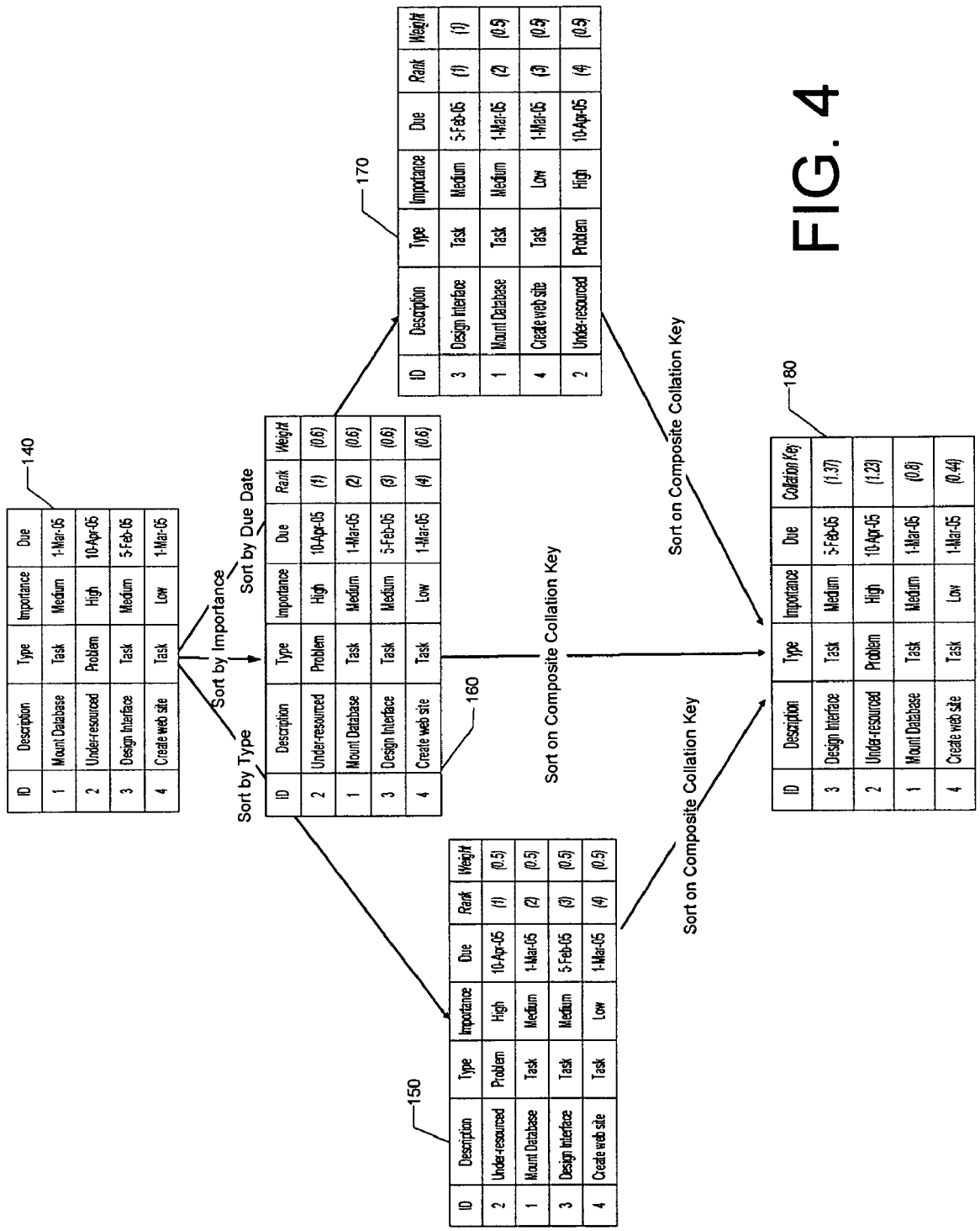
FIG. 4 shows the data states created when generating relevance-sensitive collation keys for exemplary table using exemplary sort fields: Type, Importance, and Due Date.

FIG. 4 illustrates an example of relevance-sensitive collation keys for use in sorting a table 140 of data. In this example, the rows of the table represent the data objects, and the columns of the table 140 represent fields.

The data for this example represents an agenda of "to-do" items. The sort fields in this example are Type, Importance, and Due Date.

Table 150 shows the rankings for each record when the table 140 is sorted by Type. Table 160 shows the rankings for each record when the table 140 is sorted by Importance. Table 170 shows the rankings for each record when the table 140 is sorted by Due Date.

For the purpose of this example, suppose the current date is 5 Feb. 2005.

The weight function for each sort field is given in pseudo-code in the following table, where x is the value of the sort field and w is the result value returned by the weight function:

| Sort Field | Weight Function w | Notes |
|---|---|---|
| Type | set w = 0.5 | Constant valued function |
| Importance | set w = 0.6 | Constant valued function |
| Due Date | if x = today then set w = 1<br>else if x = tomorrow then<br>    set w = 0.9<br>else set w = 0.5 | Piecemeal function |

Tables 150, 160, and 170 show the computed values of rank and the weight ascribed to the ranking for each data object under each of the sort fields, i.e., Type, Importance, and Due Date.

Table 180 shows the final sort order of the data objects together with the composite collation key that was used in the sort operation.

In this example items due today or tomorrow tend to bubble to the top of a sorted list. For all other items the Importance field will be the chief determiner of the items' final position after a sort operation.

Examples of Areas of Application

The method is described herein in terms of a control system controlling complex processes that includes scheduling a large set of tasks. For example, in a complex processing plant there may be a need to schedule and manage a large number of technical tasks. The technical tasks have multiple attributes, e.g., attributes that are definable by a numeric quantity. A computerized control system may be involved in assigning these tasks to one or more task performing entities of the plant. Such a computerized control system may include a data structure, e.g., a database in which each task is represented by a record. Each task's attributed can be represented by different fields in the records.

The method described herein is also applicable to ordering data objects such as records in a computer-based activity management systems. By an activity management system is meant a computer based system for managing activities, risks, and/or issues. In such systems, lists are used, such as: lists of projects; lists of project portfolios; lists of tasks; lists of risks; and/or lists of issues/problems/defects. Other lists too are used.

When applied to such activity management systems, the method and system described herein may be useful in situations including those in which the following three conditions hold:

1) A large volume of records is collected, possibly by more than one person.

2) The records are not manually sorted, or the desired sort order differs from person to person, or from time to time.

3) More than one field contains values that are relevant to the desired sort order. That is, the position if items in the sorted list depends on more than one factor.

Examples of application of one or more aspects of the present invention include the following.

Example 1

In a complex processing consider a control system that manages, including scheduling a large number of technical tasks. The technical tasks have multiple attributes, e.g., attributes that are definable by a numeric quantity. The computerized control system is involved in assigning these tasks to one or more task performing entities of the plant. Such a computerized control system includes a data structure, e.g., a database in which each task is represented by a record. Each task's attributed can be represented by different fields in the records.

In such a control system, there is often a need to determine the ordering of the tasks, e.g., which task is to be performed next. There also may be a need for the control system to display the ordering of the tasks on a display device so that a human user can view the ordering. Suppose the control system is to control performing a set of tasks that relate to safety. Suppose on the fields is an indication of the importance of the task as it related to safety, and another of fields is an indication of the time remaining until the task has to be completed else safety is affected. Suppose the control system is to schedule performing of the tasks as to which is to be performed first, which second, etc. It is desired to sort the records according to a sort key that incorporates both the importance of the task, and the time to completion, so that the control system can order the tasks and assign the tasks to be performed according to the ordering. There further is a need to display the ordering to a human observer via a display device.

Example 2

Consider a computer running a complex project management system for managing a complex technical project. The following operations need to be performed:

a) Sorting tasks according to the sequence in which they should be performed, where the position of an individual task in the sort result depends on more than one factor, including when the task is due, how important the task is, whether the task is on the critical path, whether the task is running late, whether the task has a large number of dependent successor tasks, and so forth.

b) Sorting issues that have risks according to the sequence in which the issues should be addressed, where the position of an individual issue risk in the sort result depends on more than one factor, including the severity of the issue, the value of the service level agreement with the affected customer, the availability of relevant staff, and so forth.

Example 3

Consider a computer system programmed to schedule resources and that needs to perform sorting a list of human resources for assignment to a project, where the position of an individual human resource in the sort result depends on more than one factor, including the qualifications of the human resource, the availability of that resource, recent performance statistics and so forth.

Example 4

Consider a computer controller that includes a reporting system that needs to sort a list of exceptions for an exceptions report, e.g., tasks that are running late or have been rescheduled, and the position of an exception in the sort result depends on more than one factor, including how important the task is, the number of impacted successor tasks, the impact of the exception on the task, and so forth.

Alternative Embodiments

Step Sequence

In the embodiment shown in FIG. 3, steps 110, 120, and 130 have been listed separately to indicate their separate outcomes. However, to gain increased efficiency and turnaround time, alternative embodiments may include generate these outcomes by merging steps 110 and 120 in a single step for each sort field.

Note that the ordering in these flow charts may be changed maintaining as appropriate while maintaining the scope of the invention. For example, in accordance to another embodiment, steps 110 and 120 are out independently but in reverse order to that shown in FIG. 3.

Computing Rankings

In an alternate embodiment, rankings are generated by sorting meta-data associated with the target data objects, rather than their constituent data fields. For example, many search engines rank search results based on meta-data such as "click-through rates" or probability that the individual search result is a good match for the search term(s).

In another alternate embodiment, rankings are calculated ahead of time, with the ranking results stored in a cache, e.g., in RAM or even in mass Storage in memory unit 260. Such an alternate embodiment is useful in situations where fast turnaround times for the final sort are critical and where the set of data objects to be sorted and their respective values remain static between the time of the rankings computation and the time when the results are actually used for generating the composite collation keys.

According to yet another alternate embodiment, the nature of some fields, particularly fields with numerical data, are such that the value stored in the field of a given data object is used directly as the ranking of that data object. One example of this is a database table wherein each record is assigned a unique numerical identifier such that the first record is identified by the number 1, the next record by 2, and so on forth, no gaps in the arithmetic progression of identifiers. In such a case, if the identifier field is used as a sort field, it is not necessary to run a conventional sort on that field. Instead the value of the field is assumed to also represent the rank. Especially if there is no requirement to run a stable sort, i.e. a sort that always resolves a partial order in the same way, it will be frequently possible to use a field value directly as the ranking value.

Computing Non-linear Functions of the Rank Values

While embodiments are described herein for determining a collation key as a weighted sum of ranking values, in another embodiment, the collation key is determined as a multidimensional function of the ranking values. In yet another version, the collation key is determined as a sum of functions of the individual ranking values.

Computing Weights

According to an alternate embodiment of the present invention, the weight function accepts as input the current operating context of the use and use this information as part of the weight value generation. For example, an application program triggering a sort method may supply information about which of a set of files the user currently has open. The weight generation function prioritizes data objects that relate to files that are open with a higher weight than those that are closed.

According to another embodiment of the present invention, weights associated with data states present in individual data objects are generated using a learning method or other artificial intelligence method. Those skilled in the art will appreciate that there exist many prior art techniques, including neural networks and fuzzy logic systems that can reason under uncertainty about decisions involving the classification of data based on specific data states and/or historical experience. Thus, some embodiments include techniques and systems that enable embodiments that do not require the explicit manual definition of the function(s) that compute the weight(s) of sort fields given a set of conditions. Learning methods will improve over time with respect to the accuracy of their weight value computation.

According to yet another embodiment of the invention, weight generation functions take as input data extraneous to the data objects being sorted and use such information in computing the weights assigned to sort fields. Such data may include information contained in related data objects, e.g. in a related table, or meta-data that describe the data contained in the data object but are not part of the data objects themselves. Similarly, some embodiments may also consider the relationships that exist between the data objects themselves. For example, according to one alternate embodiment operating on database records that each have an ID field, the weight function attached to the ID field of the records produces a weight value proportional to the number of records that refer to the ID value of a given record by means of a foreign key reference. According to this embodiment those records that serve as a reference for the largest number of other records would tend to bubble to the top of the list and precede their referring records.

Weight functions may be assigned at sort time or at an earlier stage. In some embodiments the weight function may be fixed, while in others it will be flexibly configurable and changeable. The configuration of weight functions may be done manually or determined by an automated agent or program.

Computing Composite Collation Keys

According to an alternative embodiment of the present invention, the composite collation key for data object Oi is generated according to the following formula:

$$K_i = \sum_{j=1}^{m} (((n - R_{OiFj}) \times W_{OiFj})),$$

where m is the total number of sort fields per data object.

According to yet another embodiment the collation key Oi is generated according to the following formula:

$$K_i = \underset{j}{\mathrm{MAX}}\left(\left(\frac{W_{OiF1}}{R_{OiF2}}\right), \left(\frac{W_{OiF2}}{R_{OiF2}}\right), \ldots, \left(\frac{W_{OiFm}}{R_{OiFm}}\right)\right)$$

where MAX is a function that returns the maximum value of the given input parameters over values of j.

Those skilled in the art will appreciate that there are many possible embodiments offering different methods for creating a composite value such that rankings assigned to data objects by sort operations according to each sort field are moderated by weights and that these moderated values are combined into a composite collation key value.

Operation of embodiments of the present invention is similar in most aspects to operation of embodiments of prior art collation key generators. As in such prior art method, a sort method provides both a set of data objects to be sorted and a set of sort fields to use in the sort operation. Depending on the embodiment these may be provided to the method by name, by reference, or by a pointer.

Embodiments of the present invention includes defining weight generating functions to determine weight values for each sort field, and at the time of generating, pass onto embodiments of these weight generating functions any input data required by the function to determine the weight value.

Embodiments of the present invention may vary according to when and how the weight functions are determined and defined for each sort field. Possibilities include:

Definition at sort time;

Definition at some point ahead of the sort operation; or

A combination of the above, such that the weight for some fields are defined early, and some are configured at sort time.

According to one embodiment of the present invention the weight functions are determined and defined by a human user. According to another embodiment of the present invention the weight functions are determined and defined by an automated agent that determines the appropriate function based on the user's current operating context and a predetermined set of rules.

Collation keys generated according to the present invention are sorted in descending value order. Thus the resulting order of collation keys is the order in which the corresponding data objects are relevant to the user or to the user's operating context.

Where at least two data objects have the same composite collation keys, a tiebreaker method is used to resolve the result. A number of alternate methods are available for such tiebreaking. In one embodiment, the unweighted ranking resulting from a conventional sort of the affected data objects according to the given sort fields are used to resolve the relative position of the data objects. For database records, in an alternate embodiment, the tiebreaking includes comparing the relative order of the index values of the affected records.

In an application in which at least two software systems are exchanging information, it is possible that the sort and corresponding collation key generation may be initiated by a software program acting as a "user" rather than a human user.

Advantages

From the discussion above, a number of advantages of the relevance-sensitive collation key generation system and methods become evident. Using an embodiment of the invention results in at least one or more of the following:

a) The collation keys produced for each data object reflect the degree of relevance to the user or operating context of the data object.
b) Conventional sort methods can be adapted to make use of this collation key generation system thereby extending the utility of the pre-existing sorting system.
c) The relevance of data objects can be assessed by methods hand-picked for their suitability in any given situation to produce the best possible assessments.
d) Client software systems can use relevance-sensitive sorting to restrict listings and reports to only the most relevant items, thereby reducing the risk of information overload, oversights and wasted paper.
e) A listing in relevance order can be read more efficiently by human users.

CONCLUSION, RAMIFICATIONS, SCOPE

Accordingly, the user will see that the relevance-sensitive collation key generation of embodiments of the present invention can be used in a wide variety of sorting methods, and enables the ordering of data objects according to their relevance to a user and/or the user's current operating context. Further, the invention allows for a wide variety of possible embodiments that can be tailored to achieve the best relevance assessments and performance possible in each usage scenario. In addition relevance assessments can be refined over time either by manual configuration or automated learning systems.

Embodiments may also vary widely in how data object rankings, sort field rankings, and the composite collation keys are computed. For example an alternative embodiment can function without requiring weights to be real numbers between 0 and 1. Similarly, rank could be represented by numbers other than positive integers.

Further, the present invention may be implemented using any combination of computer programming software, firmware or hardware.

Further, the collation key generator of this invention does not need to be directly integrated into a sort method, but could be embodied as a separate process in such a way that the generated collation keys become available to a sort method which is subsequently used to sort the collation keys and their associated data objects. For example, when sorting a set of records in a database, the collation keys can be generated and stored in the database. A subsequent database sort operation can then be run across the stored collation keys.

Throughout this description, the embodiments and examples shown should be considered as exemplars, rather than as limitations of the present invention.

The term "data object" has been used throughout the document to refer to the information elements for which collation keys are generated. It should be appreciated that for the purpose of this document the term "data object" refers to any and all forms of data storage structures, including, but not limited to records stored in a database, records stored in any given file format, or any other type of persistent or temporary data structure comprising a plurality of fields that may contain data values.

Persons skilled in the art will appreciate that some data structures and databases allow a plurality or array of values to be contained within the same field. It should be appreciated that the embodiments of the present invention can be applied recursively in the case of such multi-valued fields.

For the purpose of this document the term "relevance" may be taken to mean the degree of connectedness, semantic closeness, or relatedness between a given data object and the user or the user's operating context.

The term "user" may refer to a human user or an automated agent or system triggering a sort method so as to obtain an ordered set of data objects. Therefore, a control system carrying out the sort for the purpose of scheduling or otherwise controlling a set of processes carrying out tasks is a "user" as defined herein.

The term "operating context" has been used throughout the document to refer to the circumstances within which the sort operation is executed, including one or more of:

The state of data objects in memory (temporary or permanent).
The file(s) currently open (also called "active").
The record(s) currently being viewed or being input.
The identity, preference settings and security profile of the user and/or of other users with which the user is in communication for the purpose of an electronic transaction.

The methodologies described herein are, in one embodiment, performable by a machine, e.g., a processing system that includes a one or more processors that accept machine-readable containing instructions. For any of the methods described herein, when the instructions are executed by the machine, the machine performs the method. Any machine capable of executing a set of instructions, sequential or otherwise, that specify actions to be taken by that machine are included. Thus, a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a computer-readable medium that stores machine readable instructions, e.g., software, including instructions for performing, when executed by the processing system, one or more of the methods described herein. The software may reside in the hard disk, or may also reside, completely or at least partially, within the RAM and/or within the processor during execution thereof by the computer system. Thus, the memory and the processor also constitute computer-readable medium storing machine readable instructions.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that stores the instructions, those in the art will understand that many of the components described above are included, but not explicitly shown or described in order not to obscure the inventive aspects. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of wireless Dbridge. Thus, as will be appreciated by those skilled in the art, embodiments of the present invention may be embodied as a method, an apparatus such as a special purpose apparatus, an apparatus such as a data processing system, or a computer-readable medium, e.g., a computer program product. The computer-readable medium stores computer-readable instructions for controlling a processing system to implement a method. Accordingly, aspects of the present invention may take the form of a method, an entirely hardware embodiment, an entirely software embodiment or an embodiment combining software and hardware aspects. Furthermore, the present invention may take the form of computer-readable medium, e.g., a computer program product on a computer-readable storage medium storing computer-readable instructions embodied in the medium.

The software may further be transmitted or received over a network via the network interface device. While the computer-readable medium is shown in an exemplary embodiment to be a single medium, the term "computer-readable medium" should be taken to include a single medium or multiple media, e.g., a centralized or distributed database, and/or associated caches and servers that store the one or more sets of instructions. The term "computer-readable medium" shall also be taken to include any medium that is capable of storing, or encoding a set of instructions for execution by the machine and that cause the machine to perform any one or more of the methodologies of the present invention. A computer-readable medium may take many forms, including but not limited to, non-volatile media, and/or volatile media. Non-volatile media includes, for example, optical, magnetic disks, and magneto-optical disks. Volatile media includes dynamic memory, such as main memory. For example, the term "computer-readable medium" shall accordingly be taken to included, but not be limited to, solid-state memories, and/or optical and magnetic media.

It will be understood that the steps of methods discussed are performed in one embodiment by an appropriate processor, or processors of a processing system, e.g., a computer system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B which may be a path including other devices or means.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. A method of operating a computerized control system that includes at least one processor and a memory, the control system being for controlling a plurality of tasks, activities, and/or attributes, the method comprising:
   (a) converting or representing the tasks, activities, and/or attributes that are to be controlled to or by a plurality of data objects that correspond to respective tasks, activities, and/or attributes;
   (b) providing a plurality of ranking values for each of the plurality of data objects, the data objects for sorting, such that a ranking value is generated for each corresponding sort field of a plurality of sort fields for each data object, each ranking value being indicative of the sort order of the data object or of meta-data associated with the data object, the sort order using only the sort field corresponding to the ranking value;
   (c) providing a function of a plurality of the ranking values corresponding to the plurality of sort fields, and using the provided function to generate a single collation key value for the data objects that is determined from each of a row with values in each of N fields to determine a weight for each value, the collation key arranged to provide for ordering the plurality of data objects, the function for a particular data object indicative of the relative degree to which the ranking value for each of the plurality of corresponding sort fields influences the collation key; and
   (d) using the collation key for ordering the tasks, activity, and/or attributes that correspond to the data objects,
   wherein the collation key is arranged to provide for ordering the plurality of data objects according to their respective relevance to a user, user operating context, or a system acting as a user system.

2. A method as recited in claim 1, wherein the function is a weighted linear function so that (c) includes:
   (i) generating a weight value for each of the ranking values for the plurality of sort fields, each weight value for a sort field for a data object indicative of the degree to which the ranking value for the sort field for the data object influences a collation key for sorting the data objects, the generating of the weight being according to a weight generating function; and
   (ii) generating a value of the collation key for each of the data objects using the respective weight values to weight the ranking values of the plurality of sort keys.

3. A method as recited in claim 2, wherein the collation key for a particular data object includes a reference to the particular data object.

4. A method as recited in claim 2, wherein the control system is for scheduling a plurality of tasks and wherein the data objects represent tasks that are part of data in the computerized control system for scheduling the plurality of tasks.

5. A method as recited in claim 2, wherein the control system is a computer-based activity management system and the data objects are part of data in the computer-based activity management system.

6. A method as recited in claim 2, wherein the plurality of data objects is for sorting according to a set of one or more sort fields, and wherein said step (b) includes the generation of one ranking for each sort field in a manner such that a ranking value is generated for each sort field for each data object according to the sort order of the object for the sort field.

7. A method as recited in claim 2, wherein (c)(ii) includes weighting each of the ranking for a sort key with its corresponding weight value, and combining the results of weighting to form the collation key.

8. A method as recited in claim 2, wherein generating the ranking for some objects is according to the value in the corresponding sort field for the data object or a mathematical transformation of the value in the corresponding sort field.

9. A computer readable storage medium having encoded thereon instructions that include instructions that when executed by at least one processor of a processing system that is part of a control system for controlling a plurality of tasks, activities, and/or attributes cause the control system to:
   (a) convert or represent the tasks, activities, and/or attributes that are to be controlled to or by a plurality of data objects that correspond to respective tasks, activities, and/or attributes;
   (b) provide a plurality of ranking values for each of a plurality of data objects, the data objects for sorting, such that a ranking value is generated for each corresponding sort field of a plurality of sort fields for each data object, each ranking value being indicative of the sort order of the data object or of meta-data associated with the data object, the sort order using only the sort field corresponding to the ranking value;
   (c) provide a function of a plurality of the ranking values corresponding to a plurality of sort fields, and using the provided function to generate a single collation key value for the data objects that is determined from each of a row with values in each of N fields to determine a weight for each value, the collation key arranged to provide for ordering the plurality of data objects, the function indicative of the relative degree to which the ranking value for each of the plurality of sort fields influences the collation key and
   (d) use the collation key to ordering the tasks, activity, and/or attributes that correspond to the data objects,
   wherein the collation key is arranged to provide for ordering the plurality of data objects according to their respective relevance to a user, user operating context, or a system acting as a user system.

10. A computer readable storage medium as recited in claim 9, wherein the function is a weighted linear function so that (c) includes:
    (i) generating a weight value for each of the ranking values for the plurality of sort fields, each weight value for a sort field for a data object indicative of the degree to which the ranking value for the sort field for the data object influences a collation key for sorting the data objects, the generating of the weight being according to a weight generating function; and
    (ii) generating a value of the collation key for each of the data objects using the respective weight values to weight the ranking values of the plurality of sort keys.

11. An apparatus comprising:
    a processing system to control a plurality of tasks, activities, and/or attributes, including a computer readable medium comprising instructions that when executed are configured to:
    (a) convert or represent the tasks, activities, and/or attributes that are to be controlled to or by a plurality of data objects that correspond to respective tasks, activities, and/or attributes;

(b) generate a plurality of ranking values for each of a plurality of data objects, the data objects for sorting, such that a ranking value is generated for each corresponding sort field of a plurality of sort fields for each data object, each ranking value being indicative of the sort order of the data object or of meta-data associated with the data object, the sort order using only the sort field corresponding to the ranking value;

(c) generate a weight value for each of the ranking values for each sort field indicative of the degree to which the ranking value for the sort field influences a collation key for sorting the data objects, the generating of the weight order being according to a weight generating function that is determined from each of a row with values in each of N fields to determine a weight for each value; and (d) generate a value of the collation key for each of the data objects, the collation key arranged to provide for ordering the plurality of data objects according to their respective relevance to a user, user operating context, or a system acting as a user system;

(e) carry out ordering according to the value of the collation key in order to control a plurality of tasks, activities, and/or attributes corresponding to the data objects.

12. An apparatus as recited in claim 11, wherein the function is a weighted linear function so that the instructions that when executed are configured to generate the weight value for each of the ranking values includes instructions that when executed are configured to:

(i) generate a weight value for each of the ranking values for the plurality of sort fields, each weight value for a sort field for a data object indicative of the degree to which the ranking value for the sort field for the data object influences a collation key for sorting the data objects, the generating of the weight order being according to a weight generating function; and (ii) generate a value of the collation key for each of the data objects using the respective weight values to weight the ranking values of the plurality of sort keys.

13. An apparatus as recited in claim 12, wherein the processing system is part of a control system for scheduling a plurality of tasks and wherein the data objects represent tasks that are part of data in the computerized control system for scheduling the plurality of tasks.

14. An apparatus as recited in claim 12, wherein the processing system is part of a computer-based activity management system and the data objects are part of data in the computer-based activity management system.

15. A computer readable storage medium as recited in claim 10, wherein the collation key for a data object includes a reference to the particular data object.

16. A computer readable storage medium as recited in claim 10, wherein the control system is for scheduling a plurality of tasks and wherein the data objects represent tasks that are part of data in the computerized control system for scheduling the plurality of tasks.

17. A computer readable storage medium as recited in claim 10, wherein the control system is a computer-based activity management system and the data objects are part of data in the computer-based activity management system.

18. A computer readable storage medium as recited in claim 10, wherein the plurality of data objects is for sorting according to a set of one or more sort fields, and wherein said step (b) includes the generation of one ranking for each sort field in a manner such that a ranking value is generated for each sort field for each data object according to the sort order of the object for the sort field.

19. A computer storage readable medium as recited in claim 10, wherein (c)(ii) includes weighting each of the ranking for a sort key with its corresponding weight value, and combining the results of weighting to form the collation key.

20. A computer storage readable medium as recited in claim 10, wherein generating the ranking for some objects is according to the value in the corresponding sort field for the data object or a mathematical transformation of the value in the corresponding sort field.

* * * * *